April 25, 1933.  A. O. SHAFER  1,905,512

CLAMP FOR SAWS AND THE LIKE

Filed July 21, 1930

INVENTOR
Alvin O. Shafer
BY Chappell Earl
ATTORNEYS

Patented Apr. 25, 1933

1,905,512

UNITED STATES PATENT OFFICE

ALVIN O. SHAFER, OF KALAMAZOO, MICHIGAN

CLAMP FOR SAWS AND THE LIKE

Application filed July 21, 1930. Serial No. 469,466.

I have illustrated and described my improvements as I have embodied the same in a clamp for linotype trimming saws. My improvements are, however, adapted for use in other relations where it is desired to provide a clamp which may be quickly adjusted to work of varying sizes or thicknesses and be very quickly actuated to clamp the work or to release it.

A further object is to provide a clamp which is very convenient to manipulate.

Objects relating to details and economies of my invention will appear from the description to follow. The invention is defined and pointed out in the claims.

A structure which is a preferred embodiment of my invention is illustrated in the accompanying drawing, in which.

Figure 1:
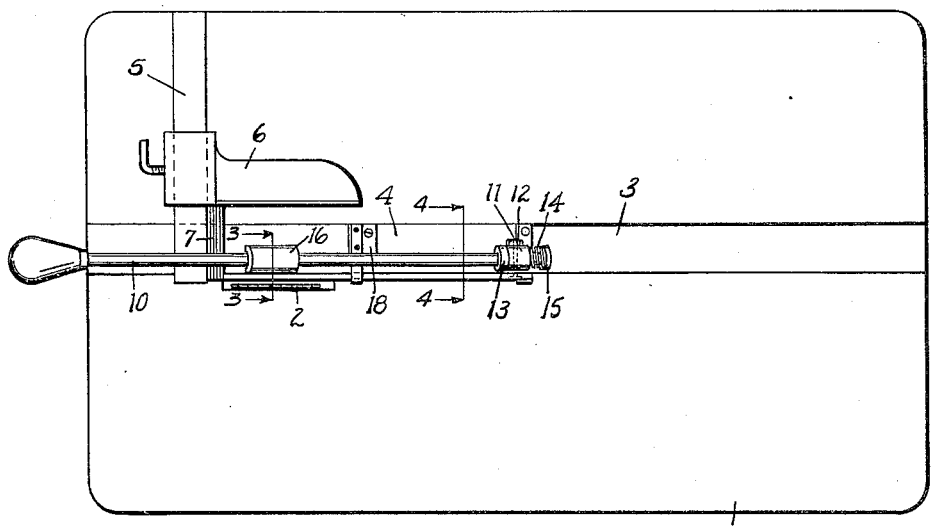
Fig. 1 is a plan view of a sawing machine of the linotype trimming type embodying the features of my invention.
Figure 3:
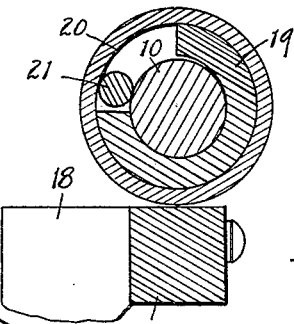
Fig. 3 is an enlarged detail section on a line corresponding to line 3—3 of Fig. 2.
Figure 4:
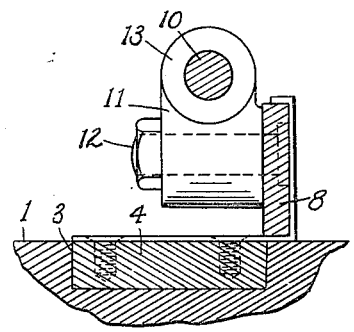
Fig. 4 is an enlarged detail section on a line corresponding to line 4—4 of Fig. 2.
Figure 2:
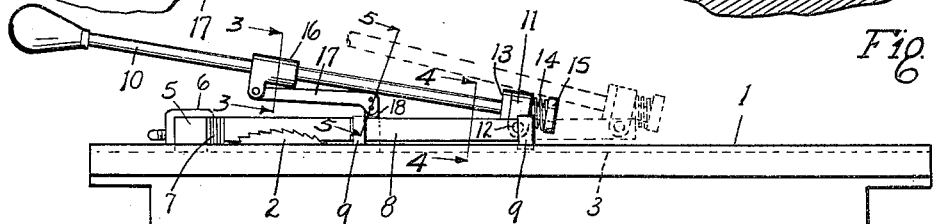
Fig. 2 is a fragmentary side elevation, the clamp being shown in one position by full lines and in another position by dotted lines.
Figure 5:
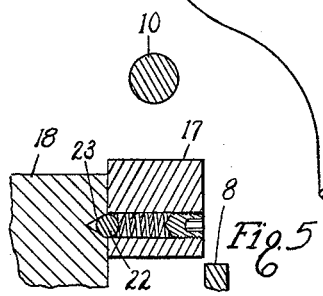
Fig. 5 is an enlarged detail section on a line corresponding to line 5—5 of Fig. 2.

In the accompanying drawing, 1 represents the table of the machine, the saw being indicated at 2.

The table is provided with a grooved way 3 for the carriage or slide 4. This slide is provided with an abutment 5 having a gauge 6 adjustable thereon. The work is indicated at 7.

A bar-like jaw 8 is slidably mounted on the member 4, the jaw supports being shown at 9. The jaw actuating lever 10 is connected to the jaw by means of the coupling member 11 which is connected to the jaw by the bolt or pivot 12, the lever being mounted in the coupling member for rotative and longitudinal movement. A collar 13 is disposed on the lever at the rear of the coupling member.

A coiled spring 14 is disposed on the lever in front of the coupling member, the forward end of the spring being supported by the thrust member or collar 15.

A clutch block 16 supported by the pivoted link 17 is provided, this link being carried by the post 18. Within the clutch block is an eccentric sleeve 19 partially cut away at 20 to receive the roller 21 so that the clutch may be engaged and disengaged by a rotative movement of the lever, a rotation in one direction releasing the clutch and permitting free sliding movement of the lever within the clutch and rotation in the other direction locking the lever to the clutch.

When the lever is locked to the clutch, the downward movement of the lever to the position indicated by full lines, closes the jaw owing to the fact that the clutch member swings in the arc of a circle which moves it toward the abutment member on the downward stroke and away from it on the upward stroke.

The spring 14 is of sufficient tension to insure tight clamping but is of importance as otherwise it would be necessary to very accurately position the parts before attempting to close the jaw.

I preferably provide a detent for holding the lever in its elevated position, this detent being in the form of spring pressed ball 22 on the link which engages a recess 23 when the lever is in elevated position. This yields, however, on the downward movement of the lever, it merely being intended as a means for retaining the parts in open position to facilitate adjustment.

I have illustrated and described my improvements in an embodiment which I have found very satisfactory. I have not attempted to illustrate other embodiments and adaptations which I contemplate as it is believed that this disclosure will enable those skilled in the art to embody or adapt my improvements as may be desired and still retain the advantages of a wide range of adjustment and very rapid and easy manipulation and also very secure clamping of the work.

Having thus described my invention, what I claim as new and desire to secure by Letters Patent, is:

1. In a clamp, the combination with a bed provided with an abutment member, of a bar-like jaw slidably mounted for adjustment to and from said abutment member, a post disposed at the side of the path of said jaw, a lever, a coupling member pivotally mounted on said jaw and in which said lever is mounted for rotative and longitudinal movement, a collar on said lever disposed on one side of said coupling member, a coiled spring arranged on said lever between said collar and said coupling member, said collar constituting a thrust member for said spring, a clutch with which said lever is rotatively and slidably associated and adapted to be actuated to engage and release the same by rotative movement of the lever, and a link connecting said clutch to said post, said link being provided with a spring actuated detent for holding said lever in its retracted position.

2. In a clamp, the combination with a bed provided with an abutment member, of a bar-like jaw slidably mounted for adjustment to and from said abutment member, a post disposed at the side of the path of said jaw, a lever, a coupling member pivotally mounted on said jaw and in which said lever is mounted for rotative and longitudinal movement, a collar on said lever disposed on one side of said coupling member, a coiled spring arranged on said lever between said collar and said coupling member, said collar constituting a thrust member for said spring, a clutch with which said lever is rotatively and slidably associated and adapted to be actuated to engage and release the same by rotative movement of the lever, and a link connecting said clutch to said post.

3. In a clamp, the combination with a bed provided with an abutment member, of a coacting sliding jaw, a lever, a coupling member pivotally mounted on said jaw and in which said lever is mounted for rotative and longitudinal movement, a collar on said lever disposed on one side of said coupling member, a thrust spring arranged on said lever, between said collar and said coupling member, a clutch with which said lever is rotatively and slidably associated and adapted to be actuated to engage and release the same by rotative movement of the lever, and a thrust link for said clutch pivotally mounted on said bed, said sliding jaw being moved by the swinging of said lever when the latter is in engagement with said clutch.

4. In a clamp, the combination with a bed provided with an abutment member, of a coacting sliding jaw, a lever, a coupling member pivotally mounted on said jaw and in which said lever is mounted for rotative movement, a clutch with which said lever is rotatively and slidably associated and adapted to be actuated to engage and release the same by rotative movement of the lever, and a pivotally mounted thrust link for said clutch.

5. In a clamp, the combination with an abutment member, of a coacting slidably supported jaw, a lever pivotally and rotatively connected to said jaw, there also being a thrust spring in the connection for said lever to said jaw, and a clutch embracing said lever and pivotally connected to said abutment member to move towards and from said abutment on the swinging of the lever and to move said sliding jaw on the swinging of said lever when the latter is engaged with said clutch member, said clutch member being engaged and disengaged with said lever by a rotative movement of the lever.

6. In a clamp, the combination with an abutment member, of a coacting slidably supported jaw, a lever pivotally and rotatively connected to said jaw, and a clutch embracing said lever and pivotally connected to said abutment member to move towards and from said abutment on the swinging of the lever and to move said sliding jaw on the swinging of said lever when the latter is engaged with said clutch member, said clutch member being engaged and disengaged with said lever by a rotative movement of the lever.

In witness whereof I have hereunto set my hand.

ALVIN O. SHAFER.